United States Patent [19]

Beardmore et al.

[11] 4,157,465
[45] Jun. 5, 1979

[54] GAS-LUBRICATED BEARINGS

[75] Inventors: Geoffrey Beardmore; Hugh N. Evans, both of Cheltenham, England

[73] Assignee: Smiths Industries Limited, London, England

[21] Appl. No.: 581,234

[22] Filed: May 27, 1975

Related U.S. Application Data

[63] Continuation of Ser. No. 501,373, Aug. 28, 1974, abandoned, which is a continuation of Ser. No. 270,414, Jan. 10, 1972, abandoned, which is a continuation of Ser. No. 9,728, Feb. 9, 1970, abandoned.

[51] Int. Cl.² .............................................. B23K 9/00
[52] U.S. Cl. ............................................. 219/121 EM
[58] Field of Search ...... 219/121 LM, 121 L, 121 EB, 219/121 EM; 204/192 E, 298, 129.1, 129.3, 129.35, 129.65, 155, 156; 29/149.5 A; 308/9, DIG. 1; 250/492; 331/94.5 R

[56] References Cited

U.S. PATENT DOCUMENTS

| | | | |
|---|---|---|---|
| 2,702,274 | 2/1955 | Law | 219/121 R |
| 2,778,926 | 1/1957 | Schneider | 219/121 EM X |
| 3,097,154 | 7/1963 | Eck et al. | 204/192 E |
| 3,182,175 | 5/1965 | Sibley | 219/121 EM X |
| 3,410,774 | 11/1968 | Barson et al. | 204/192 E |
| 3,436,510 | 4/1969 | Fyler | 219/121 EB X |
| 3,534,385 | 10/1970 | Castaing et al. | 219/121 EB |
| 3,576,729 | 4/1971 | Sigournay et al. | 204/298 X |
| 3,611,532 | 10/1971 | Dee | 29/149.5 A X |

FOREIGN PATENT DOCUMENTS 6509207  1/1967  Netherlands ...................... 29/149.5 A

OTHER PUBLICATIONS

IBM Technical Disclosure Bulletin, Gregoretal, vol. 15, No. 4, (Sep. '72) pp. 1096997.

Primary Examiner—J. V. Truhe
Assistant Examiner—Fred E. Bell
Attorney, Agent, or Firm—Pollock, Vande Sande & Priddy

[57] ABSTRACT

The spiral grooving of a thrust-plate of an aerodynamic gas-lubricated bearing is formed by ionic bombardment of a flat face of a machined blank. The face is masked to leave exposed only those areas where material is to be removed. Grooving on a cylindrical surface of a spindle is similarly formed, the cylindrical blank being rotated to present the unmasked areas successively and repeatedly for bombardment.

4 Claims, 5 Drawing Figures

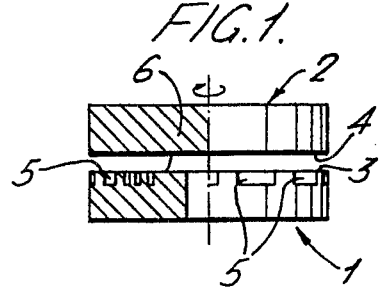
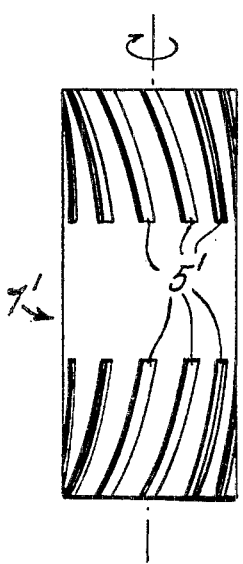
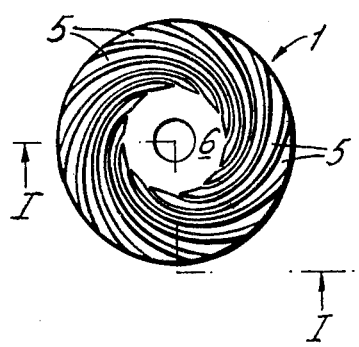
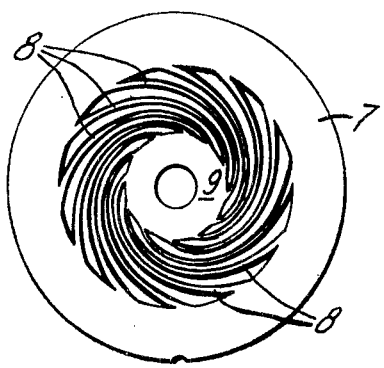

GAS-LUBRICATED BEARINGS

This application is a continuation of our application Ser. No. 501,373, filed Aug. 28, 1974, and now abandoned, which application is a continuation of application Ser. No. 270,414, filed Jan. 10, 1972, and now abandoned, which latter application is, in turn, a continuation of our application Ser. No. 9,728, filed Feb. 9, 1970, and now also abandoned.

This invention relates to gas-lubricated bearings and is concerned especially with methods of manufacture of parts thereof.

The subject matter of this application is related to that disclosed in our U.S. Pat. No. 3,684,678.

Various forms of gas-lubricated bearing have been the subject of practical and experimental investigation, but one, the aerodynamic form, is finding increasing practical application in gyroscopes and other precision instruments. This form of gas-lubricated bearing involves the generation by virtue of rotation between two parts of the bearing, of a gas pressure that acts to support one of the parts clear of the other. The pressure results from the viscous shearing that takes place in the gas between the two bearing-parts as a consequence of their relative rotation, and since the support provided by this pressure is established with a very small clearance between the two parts, it is essential for their opposed surfaces to be machined to a high degree of accuracy. The effect of the viscous shearing is in practice enhanced and stabilized by providing shallow grooves in the surface of one or other of the bearing-parts, this grooving, which is generally of a spiral configuration, being essentially of very accurately-controlled depth and surface-finish.

The opposed surfaces of the two bearing-parts need to be resistant to wear and other damage arising from contact between them when there is no relative rotation, and from the rubbing of one upon the other when rotation begins. This requirement for resistance to wear and other damage implies use of a hard material, and although advances in conventional machining methods have enabled high degrees of accuracy to be obtained over extended surfaces in hard, wear-resistant materials, there is still difficulty in providing grooves of the accurately-controlled depth and surface-finish required in the grooved bearing-parts of gas-lubricated bearings.

Because of the difficulty of machining it has earlier been proposed to form the grooving not by cutting from a plain blank, but by bonding or otherwise building up wear-resistant material on the blank where the lands defining the grooves are required. In particular, it has been proposed to provide grooving on a plain blank by bonding to it a thin metal foil that has a thickness equal to the required groove depth and is etched or punched through with apertures in the required groove pattern. Also, it has been proposed to build up the lands by sputter deposition onto the blank, and such a method is described in our U.S. Pat. No. 3,869,368, issued Mar. 4, 1975. Ser. No. 786,892 filed Dec. 26, 1968, and now abandoned.

It is one object of the present invention to provide a method of manufacturing a grooved bearing-part of a gas-lubricated bearing, that may be used to overcome the above-discussed difficulty of machining grooves from bearing blanks and also thereby avoid the need for adoption of the alternative methods involving the bonding or other build up of material on the blank-surface.

According to the present invention a method of manufacturing a grooved bearing-part of a gas-lubricated bearing, includes the step of submitting a blank of the bearing-part to ionic bombardment such as to form grooves therein by the sputtering of material from the blank.

The method of providing the grooves by ionic bombardment has been found to be particularly advantageous in that very accurate control of groove-depth can be obtained simply by regulating the time for which sputtering continues. Furthermore, the surface-finish that is obtainable within the grooves, directly as a result of the ionic bombardment and without any polishing, is of a standard that appears to be limited merely by inherent properties, such as crystallographic structure, of the blank-material used.

According to a feature of the present invention a method of manufacturing a grooved bearing-part of a gas-lubricated bearing from a blank, comprises the step of masking a surface of the blank in accordance with the grooving required in the bearing-part, the masking leaving areas of said surface exposed where grooves are required, the step of positioning the masked blank within an enclosure, the step of establishing a gaseous atmosphere of reduced pressure within said enclosure, the step of discharging electrons in said atmosphere to establish a plasma within said enclosure, and the step of attracting ions from said plasma to bombard the exposed areas of the masked blank to sputter material therefrom.

The method may include the step of applying a magnetic field to act substantially normally to the path of the discharged electrons and to rotate relative thereto.

A method of manufacturing a grooved bearing-part of an aerodynamic gas-lubricated bearing, according to the present invention, will now be described, by way of example, with reference to the accompanying drawings, in which:

FIG. 1 is a part-sectional side-elevation of the aerodynamic gas-lubricated bearing;

FIG. 2 is a plan view of the grooved bearing-part of the bearing shown in FIG. 1, the section of FIG. 1 being taken on the line I—I of FIG. 2;

FIG. 3 is a plan view of a mask used in the method of manufacture of the bearing-part shown in FIG. 2;

FIG. 6 illustrates a modification of the method applicable to the provision of grooving in cylindrical bearing-parts.

Figure 4:
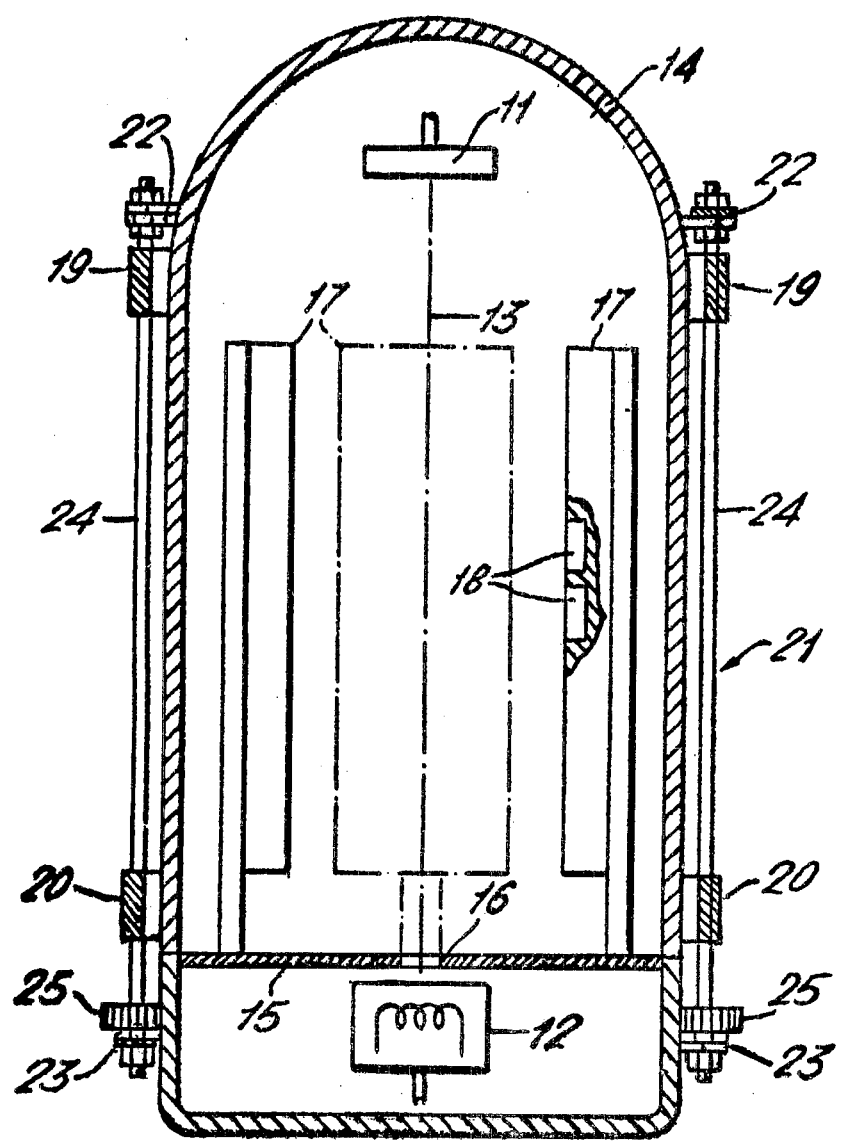
FIGS. 4 and 5 are respectively a sectional representation and an external view of sputtering apparatus used in the method.

The form of aerodynamic gas-lubricated bearing shown in FIG. 1 is for use in the provision of a rotational mounting at either end of the rotor of a gyroscope, and the method to be described is used in the batch-production of one of the two thrust-plates of the bearing.

Referring to FIGS. 1 and 2, the aerodynamic bearing comprises two circular plates 1 and 2 that have opposed bearing-surfaces 3 and 4 respectively. The surface 3 of the plate 1 is provided with a series of shallow grooves 5 of logarithmic-spiral pattern, extending from the edge of the plate 1 to a central land 6, whereas the surface 4 of the plate 2 is plain. Relative rotation between the plates 1 and 2 in the sense to cause air to be dragged inwardly along the grooves 5 establishes pressure that balances the axial load exerted between the plates 1 and 2. Since this balance is established with a spacing of only a few tenths of a thousandth of an inch between the plates 1 and 2, it is essential for the surfaces 3 and 4 to be optically flat to within one light band (that is to say, to within ten micro-inches). The surfaces 3 and 4 additionally need to be resistant to wear and other damage arising from their contact with one another when the gyroscope-rotor is stationary and from the rubbing of one upon the other when rotation begins.

The requirement for resistance to wear and other damage implies hardness, and although advances in conventional machining methods have enabled the provision of accurate surface-flatness in hard, wear resistant materials, they do not readily allow provision of the accurate grooving required in the case of plate 1; the requirement for accurate grooving is readily met in the present instance, however, using ionic bombardment of the optically-flat surface of a blank composed of the required hard, wear-resistant material. The wear-resistant material used in this example is of a hot-pressed sintered form, circular discs of this material being machined down to the overall dimensions required of the plates 1 and 2 and to provide on the plain faces a surface flatness of less than one light band C.L.A. (centre-line average).

The machined discs are useable directly in the provision of the plain plate 2 of the bearing and also as the blank from which to derive the grooved plate 1 by ionic bombardment. The ionic bombardment of the blank is performed through an annealed phosphor-bronze, or beryllium-copper, mask of the form shown in FIG. 3. This mask, which has a thickness of $5 \times 10^{-3}$ inch, has an outer rim 7 supporting narrow spiral-arms 8 extending from a central area 9 so that when it is clamped to the face of a blank it leaves exposed only those areas where grooves 5 are required.

Figure 5:
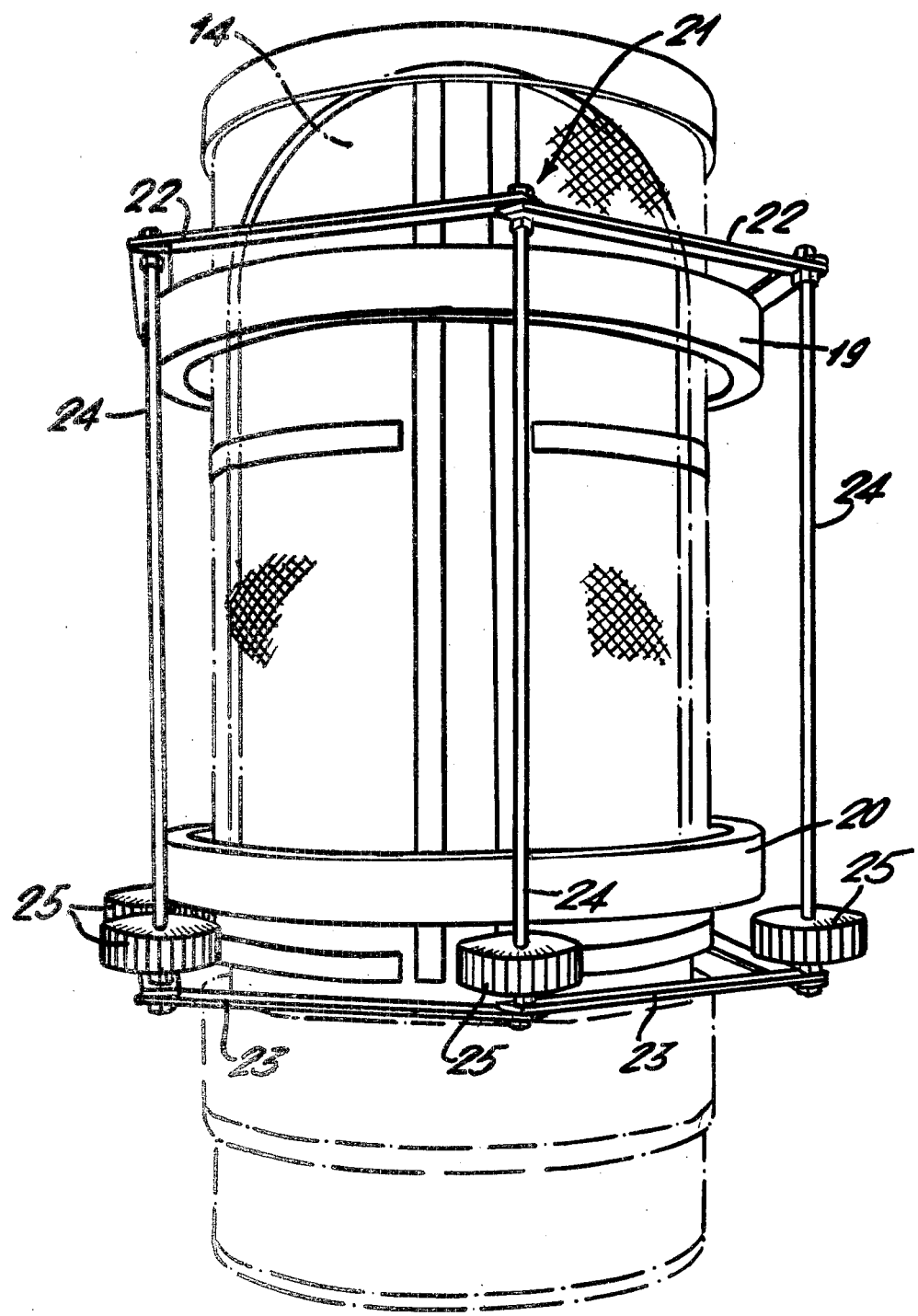

The ionic bombardment of the blank, is performed using the apparatus of FIGS. 4 and 5, a batch of some two hundred blanks being dealt with at a time.

Referring to FIGS. 4 and 5, the apparatus has an anode 11 and a filamentary-tungsten cathode 12 that are spaced from one another along the longitudinal axis 13 of an air-tight enclosure 14. A metal plate 15, which has a central aperture 16 and is positioned within the enclosure 14 adjacent the cathode 12, carries a series of stainless-steel jigs 17 that are positioned around the axis 13 and have recesses 18 to receive the individual blanks of the batch.

Two toroidally-wound electromagnets 19 and 20 encircle the enclosure 14 coaxially, adjacent the plate 15 and anode 11 respectively, and the whole is embraced by an aluminum framework 21. The framework 21 comprises two aluminum end-pieces 22 and 23 that are of hexagonal form and encircle the enclosure 14 adjacent the magnets 19 and 20 respectively, and six aluminium rods 24 that interconnect the end-pieces 22 and 23 and carry respective toroidal windings 25. The windings 25 are inductively coupled to the closed electrical paths provided by the aluminium framework 21; these paths extend lengthwise of the rods 24 to constitute single-turn secondaries coupled to the windings 25 and adapted to provide a magnetic field acting transversely, and substantially normally, to the electron-beam path along the axis 13.

Before the apparatus is used, its component-parts, together with the blanks and their individual masks, are all thoroughly cleaned. The cleaning process involves firstly the three successive steps of ultrasonic cleaning in a solution of a liquid detergent ('TEEPOL', for example) in de-ionised water, vapour cleaning in trichloroethylene, and vapour cleaning in iso-propyl alcohol. The blanks are then loaded in the recesses 18 of the jigs 17 with the masks clamped tightly to the exposed optically-flat faces. The apparatus is then re-assembled with the jigs 17 in place, all steps in the loading of the jigs 17 and re-assembly of the apparatus being carried out taking care not to handle any of the parts with contaminated tools or uncovered hands.

The enclosure 14 is next sealed and pumped down to a pressure of $2 \times 10^{-6}$ torr by means of a pump (not shown). Argon gas is then admitted through a valve (not shown), spaced in the enclosure 14 from the vent to the pump, so as to sweep through the enclosure 14 (with the pump still running) to increase the pressure to $3 \times 10^{-3}$ torr, and ensure a clean argon atmosphere within the enclosure 14. Under these conditions voltage (for example, of seventy-five volts) is applied between the anode 11 and cathode 12 sufficient to strike an arc between them to finish the cleaning-up process; no voltage is applied between the cathode 12 and the jigs 17 at this time, so ionic bombardment does not take place. This final step is not regarded as an essential in the cleaning-up process and may well be omitted.

At the end of the cleaning-up process the supply of argon is reduced so that the pressure within the enclosure 14 thereby falls to between $8 \times 10^{-4}$ and $5 \times 10^{-4}$ torr. The six windings 25 are then energized with alternating electric current having a frequency of fifty cycles per second and supplied from a three-phase source, so that the single-turn secondaries provided by the aluminium framework 21 produce a radially-directed magnetic field that rotates about the axis 13. This rotating magnetic field is maintained, and direct current is supplied to each of the electromagnets 19 and 20, throughout the whole sputtering process. During the process the anode 11 is maintained at a positive potential with respect to the cathode 12 so as to set up a substantially cylindrical plasma-column extending lengthwise of the axis 13. The axial magnetic field generated by the electromagnets 19 and 20 provides in this respect a degree of focussing of the electron beam emitted by the cathode 2 (the electromagnet 20 appears also to exert a stabilizing effect on the plasma-column); the action of the rotating magnetic field is to improve the uniformity of bombardment of the blanks.

Voltage, having a value of some six hundred volts, is applied between each jig 17 (and thereby, each of the blanks) and the cathode 12. The sense of application of this latter voltage is such that the blanks are negative with respect to the cathode 12, and accordingly such as to result in ionic bombardment of them from the plasma-column. This bombardment results in sputtering of the wear-resistant material from the exposed areas of the blanks, and such sputtering is continued for a period of some one to two hours to effect removal of material to a depth between $1 \times 10^{-4}$ and $2 \times 10^{-4}$ inch.

Accurate control of depth is obtained simply by regulating the time for which sputtering is continued. When the desired depth has been obtained, the voltages applied to the apparatus are switched off and the whole allowed to cool. The enclosure 14 is opened when all is cool, and the sputtered blanks are then removed from the jigs 17 and separated from their masks. After polishing they are ready for use.

The polishing is applied simply to remove minor surface imperfections caused, for example, by virtue of contact with the mask-material, and consists of rotating the sputtered blanks at high speed in contact with a soft cloth that is impregnated with a very fine diamond compound. The polished plates are ready for use directly in the provision of plate 1 in the bearing, the grooves in these plates having a configuration determined accurately by the masking alone, well-defined side-walls and optically-flat bases; the standard of surface-finish within the grooves appears to be limited merely by the crystallographic structure of the material used for the blanks.

The method of manufacturing grooved bearing-parts for a gas-lubricated bearing has been described above only in relation to the flat disc-like plates 1, but the method of the present invention is applicable to the provision of grooves in other than flat surfaces; for example for example, as illustrated in FIG. 6, grooving 5' may be provided in a cylindrical surface by arranging that the suitably-masked cylindrical blank 1' in this case, is rotated to present all exposed portions of the surface successively and repeatedly to ionic bombardment. In this latter context the method can readily be applied to the formation of grooves in the surface of a spindle used in an aerodynamic gas-lubricated bearing. For example, in the mounting of the gyroscope-rotor referred to above, the grooved thrust-plates provided at either end of the rotor may be clamped to opposite ends of a spindle extending with a small clearance through an axial bore of the cylindrical rotor, the grooved surface 3 of the thrust-plate 1 at each end facing in these circumstances onto the plain, annular face of the rotor at that end, rather than onto the plain surface of the plate 2 described with reference to FIG. 1. The air-pressure that in this arrangement is generated aerodynamically between the internal surface of the bore and the cylindrical surface of the spindle as the rotor rotates, serves to support the rotor clear of the spindle, and stabilization and enhancement of this effect can be achieved using a series of shallow grooves of herringbone pattern distributed around the circumference of the spindle at either end; grooves 5' of this nature can readily be formed as referred to above and illustrated in FIG. 6, by ionic bombardment of the appropriately-masked spindle-blank 1'.

The material used for the bearing-parts is preferably virtually-pure boron carbide. As referred to in U.S. patent application Ser. No. 36,655 filed May 12, 1970 in the name of Geoffrey Beardmore, now U.S. Pat. No. 3,726,572, this material has characteristics well-suited to use in a gas-lubricated bearing; in addition to being very hard, it has extremely good resistance to both corrosion and wear. Blanks of this material are preferably provided in hot-pressed form and machined down using conventional methods to the overall dimensions required, before being submitted to the ionic bombardment necessary for the accurate formation of the grooving. A preferred alternative material is silicon carbide, and as described in detail in the above-mentioned U.S. Pat. No. 3,726,572, there are advantages to be gained from the use of different materials for the opposed bearing-parts. In particular there are advantages in forming one part of boron carbide and the other of silicon carbide. Where, on the other hand, the bearing is for use in the mounting of the rotor of a gyroscope on a gimbal frame, there are important advantages, explained in the above-mentioned U.S. Pat. No. 3,726,572, in using either boron or silicon carbide for those bearing-parts carried by the gimbal frame and tungsten carbide for those of the rotor.

The present invention is applicable to the manufacture of grooved bearing-parts whether of electrically conductive, or non-conductive materials. Furthermore, attraction of the ions from the plasma in such method may be effected by means of an alternating electric field (for example of radio-frequency) this technique being applicable especially to those circumstances in which an electrically non-conductive material is to be bombarded.

Instead of using a mask to define the regions where the blank is bombarded by the ions as described above, it is possible instead to scan the blank-surface with a beam of ions and cause the bombardment from this to be of significant intensity only where material is to be removed to form the required grooving.

Proposals have been made to use aerodynamic gas-lubricated bearings where, for example, a rotatable shaft is to pass through the wall of an otherwise-sealed vessel, for the purpose of effecting a fluid-tight seal between the rotating shaft and the vessel-wall. Although in these circumstances the gas-pressure generated between the bearing-parts may be used principally for sealing purposes (and indeed rotational support may be achieved in such case by conventional bearings) the action of the device remains essentially the same and is to be understood as providing a gas-lubricated bearing in the context of this specification and the claims thereof.

We claim:

1. A method of manufacturing a flat disc-like grooved bearing part of a gas-lubricated bearing wherein the bearing part in its final form has shallow grooves of a predetermined depth on a surface thereof including the steps of:
   selecting a blank for the bearing part from a hard, wear-resistant material,
   machining said surface of the blank to be optically flat within ten micro-inches,
   masking said surface so that only those portions corresponding to the intended grooves are exposed,
   subjecting the masked face of the blank to ionic bombardment so as to form said shallow grooves therein with smooth groove bottoms and without undercutting of the sidewalls by the sputtering of material from the blank,
   and terminating the ionic bombardment when said grooves have attained a depth of at least 100 micro-inches.

2. The method of claim 1 wherein said blank is selected from the group consisting of boron carbide and silicon carbide.

3. A method of manufacturing a grooved bearing part having cylindrical form for use in a gas-lubricated bearing wherein the bearing part in its final form has grooves of a predetermined depth over the cylindrical surface thereof comprising the steps of:
   selecting the bearing part from a material which is hard and wear resistant,
   masking the bearing part so as to leave exposed only those portions corresponding to the desired grooves,
   subjecting the masked surface of the bearing part to ionic bombardment so as to form said grooves thereon with smooth groove bottoms and without undercutting of the sidewalls by the sputtering of material from the blank,
   rotating said cylindrical bearing part about its axis while it is being subjected to said bombardment,
   and terminating the ionic bombardment when said grooves have attained a desired depth.

4. The method of claim 3 wherein said blank is selected from the group consisting of boron carbide and silicon carbide.

* * * * *